United States Patent
Fahrni, Jr. et al.

(10) Patent No.: US 7,762,725 B2
(45) Date of Patent: Jul. 27, 2010

(54) ADJUSTABLE ANTIFRICTION BEARING ARRANGEMENT

(75) Inventors: Glenn R. Fahrni, Jr., Dalton, OH (US); Wayne D. Barnette, Massillon, OH (US)

(73) Assignee: The Timken Company, Canton, OH (US)

( * ) Notice: Subject to any disclaimer, the term of this patent is extended or adjusted under 35 U.S.C. 154(b) by 705 days.

(21) Appl. No.: 11/509,912

(22) Filed: Aug. 25, 2006

(65) Prior Publication Data

US 2007/0217726 A1 Sep. 20, 2007

Related U.S. Application Data

(63) Continuation-in-part of application No. 11/378,502, filed on Mar. 17, 2006.

(51) Int. Cl.
*F16C 23/06* (2006.01)
*F16C 25/06* (2006.01)
*F16C 43/00* (2006.01)

(52) U.S. Cl. .............. 384/583; 384/580; 384/585; 384/548; 384/540; 384/537

(58) Field of Classification Search ........... 384/438, 384/441, 519, 538, 540, 548, 557, 562, 564, 384/583, 585; 29/898.01, 898.07; 475/220, 475/230, 246

See application file for complete search history.

(56) References Cited

U.S. PATENT DOCUMENTS

| | | | | | |
|---|---|---|---|---|---|
| 1,894,414 | A | * | 1/1933 | Olson | 384/538 |
| 2,438,542 | A | * | 3/1948 | Cushman | 29/898.061 |
| 2,672,680 | A | * | 3/1954 | Gerner | 29/898.01 |
| 2,884,283 | A | * | 4/1959 | Korol et al. | 384/439 |
| 2,970,018 | A | * | 1/1961 | Ruttgers | 384/540 |
| 4,026,399 | A | * | 5/1977 | Ladin | 192/98 |
| 4,136,748 | A | * | 1/1979 | Dickerhoff | 175/337 |
| 4,186,828 | A | * | 2/1980 | Renaud | 192/98 |

(Continued)

FOREIGN PATENT DOCUMENTS

DE 872 893 4/1953

(Continued)

OTHER PUBLICATIONS

International Search Report for corresponding International Application No. PCT/US2007/064218—Mailing Date: Apr. 21, 2008.

(Continued)

*Primary Examiner*—Marcus Charles
(74) *Attorney, Agent, or Firm*—Polster, Lieder, Woodruff & Lucchesi, L.C.

(57) ABSTRACT

A shaft is supported in a housing on the front and rear antifriction bearings that are mounted in opposition. The front bearing has an outer race provided with an external thread that engages an internal thread within the housing. That outer race is fitted with a locking ring provided with an inner flange that is engaged to turn the race and thereby bring the front and rear bearings into the correct adjustment. The locking ring also has an axially directed outer flange that is segmented, so that one of the segments can be bent outwardly into a recess in the housing, thus providing a tab that prevents rotation of the locking ring and outer race.

16 Claims, 4 Drawing Sheets

U.S. PATENT DOCUMENTS

| | | | |
|---|---|---|---|
| 4,240,677 A * | 12/1980 | Payne et al. | 384/252 |
| 4,273,391 A * | 6/1981 | Asberg | 384/494 |
| 4,850,801 A * | 7/1989 | Valentine | 416/205 |
| 6,227,716 B1 | 5/2001 | Irwin | |
| 6,293,704 B1 * | 9/2001 | Gradu | 384/557 |
| 6,544,140 B2 * | 4/2003 | Gradu et al. | 475/246 |
| 6,659,651 B1 | 12/2003 | Turner et al. | |
| 7,001,293 B2 * | 2/2006 | Lubben | 384/540 |
| 7,090,609 B2 * | 8/2006 | Ziech et al. | 475/230 |
| 7,393,141 B2 * | 7/2008 | Fahrni et al. | 384/583 |
| 2002/0183156 A1 * | 12/2002 | Gradu et al. | 475/220 |
| 2005/0022385 A1 | 2/2005 | Slesinski | |
| 2005/0063629 A1 | 3/2005 | Fahrni, Jr. et al. | |

FOREIGN PATENT DOCUMENTS

| | | | |
|---|---|---|---|
| DE | 10347361 A1 * | 5/2005 | |
| DE | 102005026094 A1 * | 12/2006 | |
| GB | 1521668 * | 8/1978 | |
| JP | 2001336606 | 12/2001 | |
| WO | 2005054718 | 6/2005 | |
| WO | 2006014199 | 2/2006 | |
| WO | 2006020694 | 2/2006 | |
| WO | WO2006/127878 | 11/2006 | |

OTHER PUBLICATIONS

Written Opinion of the International Searching Authority for corresponding International Application No. PCT/US2007/064218—Mailing Date: Apr. 21, 2008.

* cited by examiner

ADJUSTABLE ANTIFRICTION BEARING ARRANGEMENT

CROSS-REFERENCE TO RELATED APPLICATIONS

This application is a continuation-in-part of U.S. patent application Ser. No. 11/378,502 filed Mar. 17, 2006, which is incorporated herein by reference.

STATEMENT REGARDING FEDERALLY SPONSORED RESEARCH

Not applicable.

BACKGROUND OF THE INVENTION

This invention relates in general to antifriction bearings and, more particularly, to an antifriction bearing having an outer race provided with external threads to facilitate adjustment of the bearing.

Antifriction bearings organized in pairs support shafts in a wide variety of equipment. Typically each bearing has an outer race fitted into a housing, an inner race around a shaft, and rolling elements organized in a single row between the two races. The rolling elements contact the races along raceways that are inclined with respect to the axis of the bearings, and the raceways of each bearing, while being inclined in the same direction, are inclined in the direction opposite to the inclination of the raceways of the other bearing. In other words, the two bearings that support the shaft are mounted in opposition. This enables the bearings to be adjusted against each other between end play, where the bearings have internal clearances, and preload where no internal clearances and good shaft stability exists.

Adjustment is achieved by controlling the axial positions of the races. Indeed, axial displacement of any one of the four races will change the setting of the bearings. Some bearing arrangements control the setting at the outer races—or at least at one of the outer races. And one way to control the axial position of an outer race is to provide it with an external thread that engages an internal thread in the housing. Thus, by rotating the threaded outer race in its threaded seat, one can adjust the setting for the bearings. See U.S patent application Ser. No. 2005/0063629-A1, published Mar. 24, 2005.

Tapered roller bearings represent one type of bearing that lends itself to adjustment. And automotive differentials make ample use of tapered roller bearings. Such bearings support pinion shafts in differentials and also fit around stub shafts on the ends of the carriers that deliver torque to the axle shafts. In the forward axle of a tandem axle arrangement they support the input shaft and the through shaft. As to any one of these shafts, one bearing is adjusted against another to control the setting of the two bearings.

DETAILED DESCRIPTION OF THE INVENTION

Figure 1:
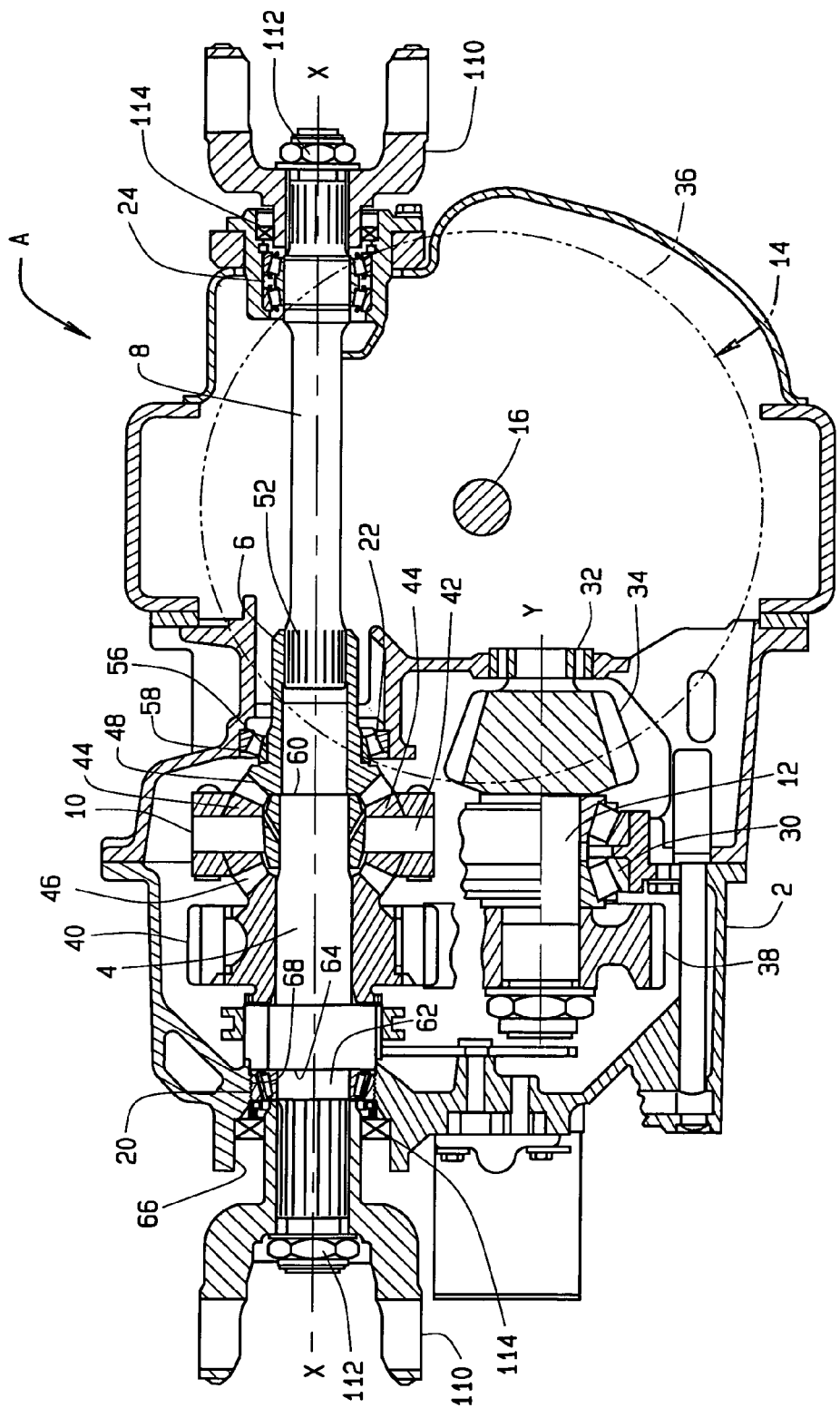
FIG. 1 is a longitudinal sectional view of an axle center for the forward axle of a tandem axle, with the axle center being equipped with a front bearing constructed in accordance with and embodying the present invention.

Referring now to the drawings, an axle center A (FIG. 1) forms part of a forward drive axle in an automotive vehicle having tandem drive axles. It serves to transfer power from a drive or propeller shaft to road wheels at the ends of the forward axle and also to transmit power to a rear axle having additional road wheels at its ends. Thus, the road wheels at the ends of both axles serve to propel the vehicle.

The axle center A includes (FIG. 1) a cast iron housing 2 that is an outer member and also three steel shafts that are inner members—namely, an input shaft 4, an output shaft 6 and a through shaft 8—that are aligned and together extend completely through the housing 2 where they rotate about a common axis X. Within the housing 2, the forward end of the output shaft 6 receives the rear end of the input shaft 4 such that the two shafts can rotate at slightly different velocities if necessary. Moreover, the input and output shafts 4 and 6 are coupled through an interaxle differential 10, whereas the through shaft 8 is connected directly to the output shaft 8. In addition, the axle center A contains a pinion shaft 12 that is likewise located in the housing 2 where it rotates about an offset axis Y and a differential gear 14 that couples the pinion shaft 12 to two axle shafts 16 that extend away from the axle center A to road wheels that they drive.

The axis X about which the input shaft 4, output shaft 6 and through shaft 8 rotate possesses a good measure of stability owing to three antifriction bearings—namely, a front bearing 20, a rear bearing 22, and a through shaft bearing 24. The front bearing 20 and rear bearing 22 take the form of a single row tapered roller bearings and support the input shaft 4 and output shaft 6. The through shaft bearing 24 preferably takes the form of a double row tapered roller bearing, and it supports the through shaft 8. The front and rear bearings 20 and 22 are mounted in opposition in the direct configuration, with adjustment being provided at the front bearing 20.

The pinion shaft 12 rotates in the housing 2 about the axis Y that is offset below, yet parallel to, the axis X. It is supported on two single row tapered roller bearings 30 that are mounted in opposition and may also be supported on a cylindrical roller bearing 32. At one end the pinion shaft 12 carries a beveled pinion 34 that meshes with a ring gear 36, both forming part of the differential gearing 14. At its other end the pinion shaft 12 is fitted with a helical gear 38 that meshes with another helical gear 40 on the input shaft 4. Thus the input shaft 4 drives the pinion shaft 12 through the meshed gears 40 and 38.

The input shaft 4 not only carries the helical gear 40, but also the interaxle differential 10. It includes a spider 42 that is located around the input shaft 4, yet can rotate on the shaft 4. The spider 42 in turn carries a pair of bevel gears 44 that have the capacity to rotate on the spider 42 about an axis that is perpendicular to the axis X. The bevel gears 44 mesh with a side bevel gear 46 on the one end of the helical gear 40 and with another side bevel gear 48 on the end of the output shaft 6 where the output shaft 6 fits over the end of input shaft 4. The rear bearing 22 lies between the output shaft 6 and the housing 2 and thus supports the output shaft 6 as well as the rear end of the input shaft 4 in the housing 2. The rear bearing 22 also supports the front end of the through shaft 8 in the housing 2. To this end, the output shaft 6 projects axially beyond the rear end of the input shaft 4 to receive the front end of the through shaft 8. Here output shaft 6 and through shaft 8 are coupled through mating splines 52.

To accommodate the rear bearing 22, the output shaft 6 is provided with a bearing seat 56 that includes a shoulder that faces toward the through shaft 8. The housing 2 likewise has a bearing seat 58 and it surrounds the seat 56 on the output shaft 6. It is provided with a shoulder that faces the shoulder on the bearing seat 56 of the output shaft 6. The bearing 22 confines the output shaft 6 in one axial direction. The output shaft 6 abuts a shoulder 60 on the input shaft 4, and that shoulder 60 serves to confine the input shaft 4 in the same axial direction and prevents the output shaft 6 from moving toward the front bearing 20. Thus, the output shaft 6 is captured axially between the rear bearing 22 and the shoulder 60 on the shaft 4, and cannot shift axially with respect to the input shaft 4.

Figure 2:
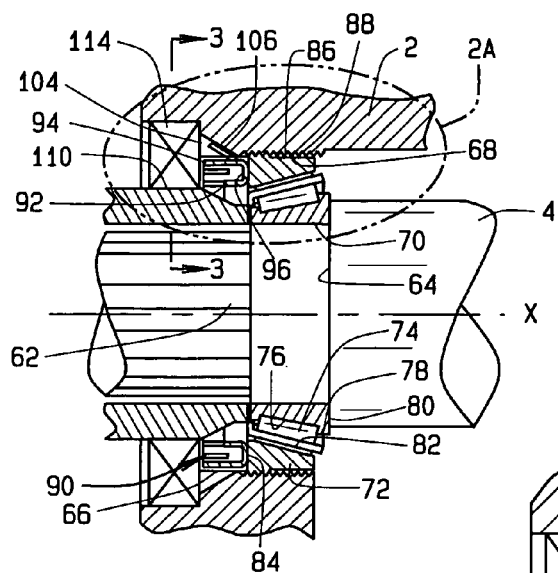
FIG. 2 is an enlarged sectional view of the front bearing and showing a locking ring that secures its threaded cup against rotation.

At its opposite end the input shaft 4 has (FIGS. 2 & 2A) a bearing seat 62 that accommodates the front bearing 20. It includes another shoulder 64 that faces away from the helical gear 40. The seat 62 lies within a counterbore 66 that opens out of the housing 2 and includes an internal thread 68 through a portion of it.

Figure 4:
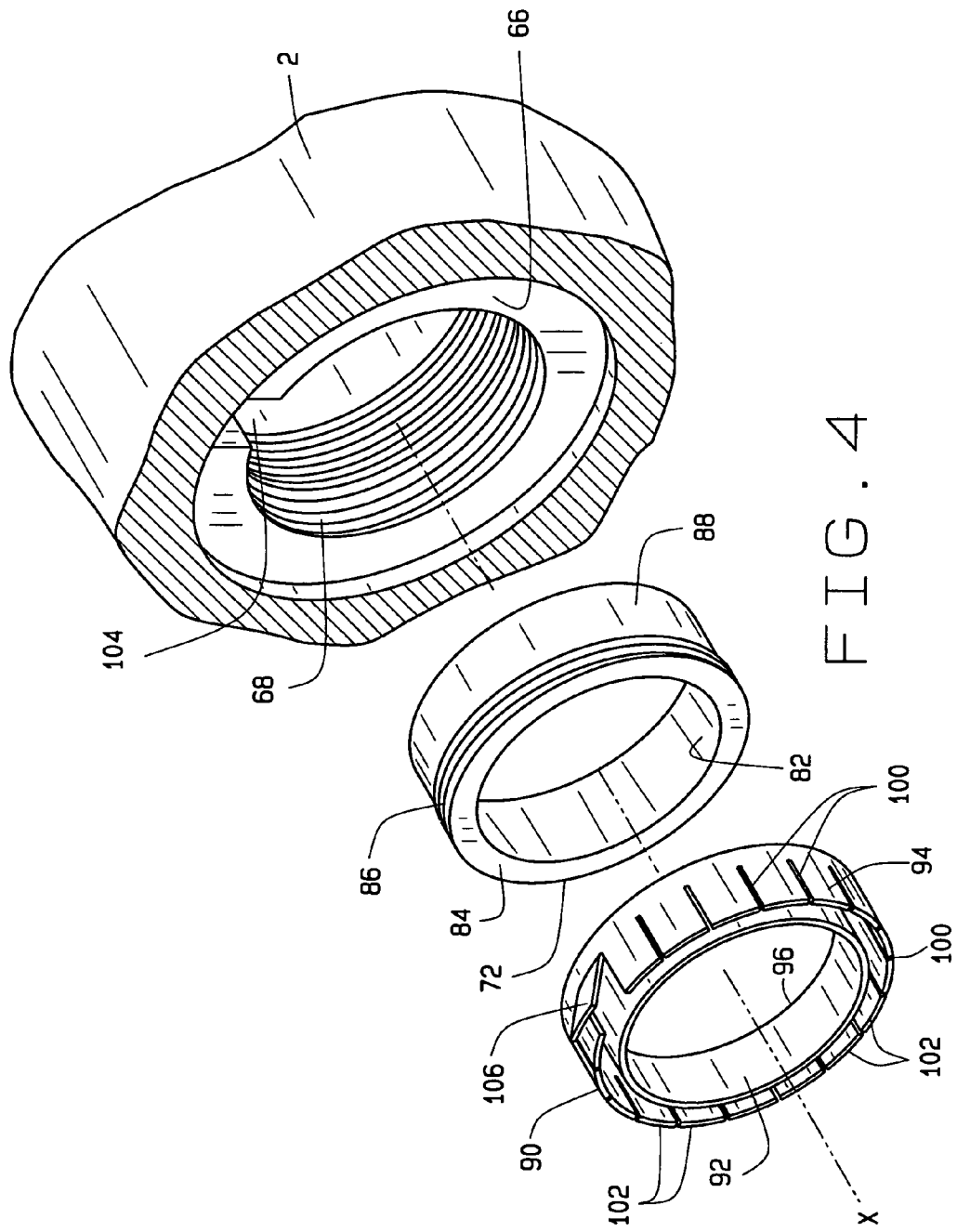
FIG. 4 is an exploded perspective view showing the housing of the differential and the threaded cup and locking ring of the front bearing.

Each bearing 20 and 22 that supports the input shaft 4 includes (FIG. 2) an inner race in the form of a cone 70, an outer race in the form of a cup 72 that surrounds the cone 70, and rolling elements in the form of tapered rollers 74 located in a single row between the cone 70 and cup 72. The cone 70 has a tapered raceway 76 that faces outwardly away from the axis X. Its large end lies along a thrust rib 78 that leads out to a back face 80 that is perpendicular to the axis X. It forms one end of the cone 70. The cup 72 has a tapered raceway 82 that faces inwardly toward the tapered raceway 76 on the cone 70. At the small end of the raceway 76 the cup has a back face 84 that is also perpendicular to the axis X. The cup 72 of the front bearing 20 differs from the cup 72 of the rear bearing 22 in that along its peripheral surface it has (FIGS. 2A & 4) an external thread 86 that is configured to engage the internal thread 68 in the housing 2. Where the cup 72 is case carburized and hardened along its case, the thread 86 may be cut through the hard case ("hard turned"), in that thread-cutting tools now exist for that purpose. On the other hand, where the cup 72 is formed from high carbon steel, it may be induction heated along the raceway 82 only, and then quenched, leaving the peripheral surface capable of being machined with more conventional cutting tools.

The tapered rollers 74 along their tapered side faces contact the raceways 76 and 82 of the cone 70 and cup 72 and along their large end faces bear against the thrust rib 78. Indeed, the thrust rib 78 prevents the rollers 74 from moving up the raceways 76 and 82 and out of the annular space between the cone 70 and cup 72. The rollers 74 are on apex, meaning that the envelopes of their conical surfaces and the envelopes of the raceways 76 and 82 have their apices at a common point along the axis X.

The cone 70 of the rear bearing 22 fits over the bearing seat 56 on the output shaft 6 with its back face 80 against the shoulder of that seat 56, so that the large ends of the tapered rollers 74 are presented toward the spider 42 of the differential 10. The cup 72 of the rear bearing 22 fits into the bearing seat 58 of the housing 2 with its back face 84 against the shoulder of that seat 58. Interference fits exist between the cone 70 and its seat 56 and the cup 72 and its seat 58.

The cone 70 of the front bearing 20 fits over the bearing seat 62 at the other end of the input shaft 4 with an interference fit, its back face 80 being against the shoulder 64 of that seat 62, so that the large ends of the rollers 74 for the bearing 20 face the large ends of the rollers 74 for the rear bearing 22. This is commonly referred to as a direct mounting. The cup 72 for the front bearing 20, in contrast to the cup 72 for the rear bearing 22, along its periphery has the external thread 86 (FIGS. 2A & 4) that leads away from the back face 80 and a cylindrical surface 88 for the remainder of its periphery. The external thread 86 occupies between 33% and 50% of the length of the cup 72. The diameter of the cylindrical surface 88 is slightly less than the diameter of the crests on the internal thread 68 in the counterbore 66. Preferably, those crests are truncated.

Figure 2A:
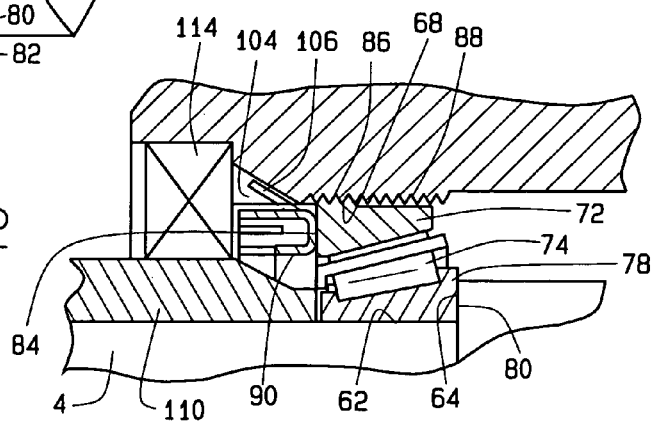
FIG. 2A is an enlarged fragmentary sectional view of the portion of the front bearing enclosed within the ellipse in FIG. 2.

The cup 72 of the front bearing 20 fits into the counterbore 66 of the housing 2 with its external thread 86 engaging the internal thread 68 in the housing 2, and with its cylindrical surface 88 lying along the crests of the internal thread 68 (FIG. 2A). Thus, the cup 72 for the front bearing 20 may be moved axially by rotating the cup 72 in the internal thread 68. And the axial position of the cup 72 determines the setting for the bearing system formed by the front and rear bearings 20 and 22. Hence, rotation of the single threaded cup 72 at the front of the housing 2 provides adjustment for the bearing system.

Figure 3:
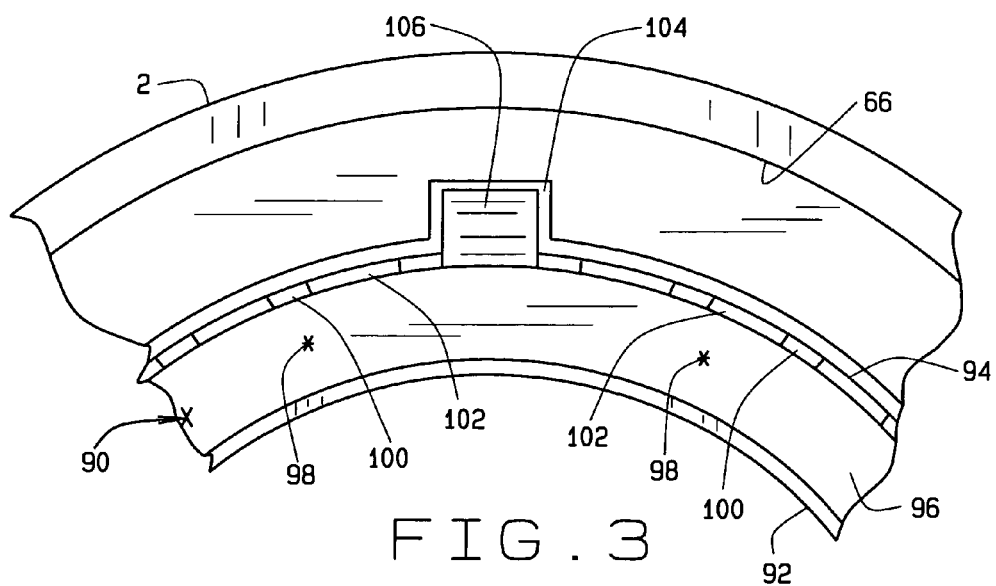
FIG. 3 is a fragmentary sectional view taken along line 3-3 of FIG. 2.

To effect rotation of the cup 72 for the front bearing 20 and securement of it in a desired position, the cup 72 is provided with locking ring 90 (FIGS. 2-4) that fits against the cup back face 84 to which it is secured, preferably by welding. More specifically, the ring 90 includes an inner flange 92, and an outer flange 94, as well as a web 96 connecting the two flanges 92 and 94. The diameter of the inner flange 92 corresponds generally to the diameter of the small end of the raceway 82 for the cup 72. The diameter of the large flange 94 is essentially that of or slightly less than the external diameter of the cup 72. The web 96 lies against the back face 84 of the cup 72 and covers essentially the entire back face 84. Here the ring 90 is attached to the cup 72, preferably by several projection welds 98 spaced generally equally along the web 96, although mechanical fasteners, such as pins or screws, that engage the cup 72 are suitable as well. Indeed, through interlocking formations on the locking ring 90 and cup 72, the two may be confined such that one cannot be displaced angularly relative to the other.

The inner flange 92 provides a surface for gripping and turning the locking ring 90 and of course the cup 72 to which the ring 90 is attached, and this enables the cup 72 to be advanced to a position which provides the correct adjustment for the bearings 20 and 22. To this end, the inner flange 92 may be provided with slots or openings capable of receiving projections on an adjusting tool that can rotate the ring 90. U.S. published application 2005/0063629, published Mar. 24, 2005, shows a suitable adjusting tool and is incorporated herein by reference.

The outer flange 94 contains (FIGS. 3 & 4) axially directed slits 100 located at equal circumferential intervals around it, and these slits 100 divide the flange 94 into segments 102 that may be bent outwardly. The housing 2 at the counterbore 66 into which the cup 72 threads has an angular recess 104 that opens radially into the counterbore 66 and is just large enough to receive one of the segments 102. Indeed, once the bearings 20 and 22 achieve the correct setting by turning the cup 72 of the front bearing 20, the segment 102 that aligns with the angular recess 104 is bent outwardly into the angular slot or recess 104, thereby creating a tab 106 that prevents rotation of the cup 72. This maintains the setting established by the rotation of the cup 72.

The cup 72 along its external surfaces, including the back face 84, is formed from high carbon steel, preferably as a consequence of case carburizing. The locking ring 90, on the other hand, is a stamping formed from low carbon steel, and is thus malleable enough to enable the segments 102 of the outer flange 94 to be bent outwardly. U.S. patent application Ser. No. 11/118,311 of David L. Milam, filed Apr. 29, 2005, discloses a process for welding the low carbon steel of the locking ring 90 to the high carbon steel of the cup 72, either by the projection welds 98 or by a lap seam weld or for that matter any other type of weld. That patent application is incorporated herein by reference.

Both the input shaft 4 and the through shaft 8 have ends that project out of the housing 2. Fitted to these ends at mating splines are yokes 110 (FIG. 1) for universal joints. The yoke 110 for the input shaft 4 is coupled to the drive shaft for the vehicle, whereas the yoke 110 for the through shaft 8 is coupled to a short connecting shaft that extends between it and the axle center for the rear axle. The yokes 110 are secured to their respective shafts 4 and 6 with nuts 112 that thread over the ends of the shafts 4 and 6. The annular spaces between the housing 2 and the yokes 110 are closed by seals 114.

Figure 5:
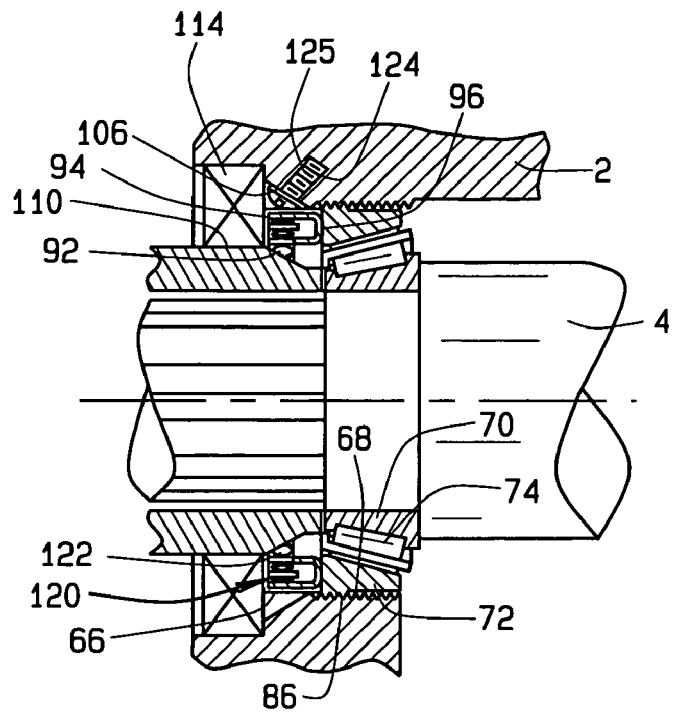
FIG. 5 is a sectional view similar to FIG. 2, but showing a front bearing with an alternate locking ring.

An alternate locking ring 120 (FIG. 5) is similar to the locking ring 90 in that it has inner and outer flanges 92 and 94 and a web 96, with the outer flange 94 being divided into segments 102 by axial slits 100. However, each segment 102 has a circular hole 122. Moreover, the housing 2, at the angular recess 104 that opens into the counterbore 60, has a threaded hole 124 that opens into the recess 104. When the appropriate segment 102 of the outer flange 94 is bent into the recess 104, the hole 122 in the tab 106 formed by that segment 102 aligns with the threaded hole 124 in the housing 2. To secure the ring 120 firmly to the housing 2, a short screw 125 is inserted through the hole 122 in the segment 102 and threaded into the aligned hole 124.

Figure 6:
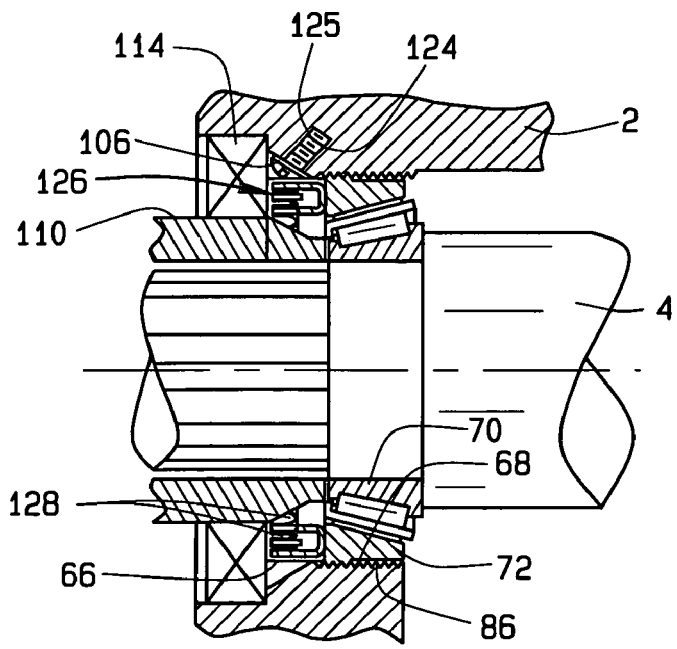
FIG. 6 is a sectional view similar to FIG. 2, but showing a front bearing with another alternate locking ring.

Another alternate locking ring 126 (FIG. 6) is very similar to the ring 120. However, its segments 102 have slots 128 that open out of their ends of the outer flange 94 in lieu of circular holes 122.

The locking rings 90, 120 and 126 may be provided without the inner flanges 92, and may be turned by engaging the outer flange 94, the web 96, or even the cup 72. Indeed, even the web 96 may be eliminated by attaching the outer flange 94 directly to the cup 72.

The bearings 20 and 22 need not be tapered roller bearings, but may be other opposed bearings that are capable of being adjusted against each other, such as angular contact ball bearings. Typically, such alternative bearings will have raceways that are inclined with respect to the axis X. Apart from that, the inner raceways 76 for the bearings 20 and 22 need not be on discrete inner races or cones, but instead may be directly on the shafts that they support, and that holds true for the thrust ribs 78 as well.

Moreover, the bearing 20, with its cup 72 provided with the external thread 86 and fitted with any one of the locking rings 90, 120 or 126 may support other shafts in the axle center A, such as the pinion shaft 12 or stub shafts projected from the carrier that contains the differential gearing 14, or the through shaft bearing 24. Indeed, the bearing 20 with a cup 72 having external threads and anyone of the tabbed locking rings 90, 120 or 126 may be used to support almost any shaft in a differential irrespective of whether the differential forms part of a tandem axle or a single axle, or for that matter irrespective of whether it is part of an axle at all. In this regard, it may be used in differentials for vehicles in which no solid axles exist, such in most front wheel drive automobiles.

Actually, the bearing 20 may be used to facilitate rotation between a housing and a shaft in virtually any type of machinery where a threaded cup might prove advantageous over other devices for adjusting bearings, such as locking nuts, shims and spacers, and also irrespective of whether the bearing 20 and its counterpart are mounted in the direct configuration, as in the axle center A, or in the indirect configuration.

The invention claimed is:

1. An antifriction bearing for facilitating rotation about an axis, said bearing comprising;
    an outer race having an outer raceway that is presented inwardly toward the axis and also having an external thread presented outwardly away from the axis;
    an inner raceway presented outwardly toward the raceway of the outer race;
    rolling elements arranged in a row between and contacting the outer and inner raceways; and
    a locking ring coupled directly to the outer race such that the outer race and locking ring cannot be displaced angularly or axially with respect to each other, the locking ring having an outwardly exposed flange that is directed generally axially and is divided into circumferentially arranged segments, any one of which can be bent away from the general axial orientation to form a tab that will interfere with a structure in which the outer race is to be housed and thereby prevent the locking ring and outer race from rotating relative to that structure.

2. A bearing according to claim 1 wherein the outer race has an end face and the locking ring has a web from which the flange projects, and the web of the locking ring is against the end face of the outer race.

3. A bearing according to claim 2 wherein the locking ring has another flange that projects from the web and is located inwardly from the segmented flange, the other flange being configured for engagement by a tool designed to rotate the locking ring and the outer race.

4. A bearing according to claim 2 wherein the raceways are inclined, with each having a large end and a small end; and wherein the end face of the outer race is at the small end of the raceway for the outer race.

5. A bearing according to claim 2 wherein the web of the locking ring is secured against the end face of the outer race by a weld.

6. A bearing according to claim 1 wherein each segment of the segmented flange has a hole.

7. A bearing according to claim 1 wherein each segment of the segmented flange has a slot.

8. The bearing according to claim 1 in combination with a housing having an internal thread that is engaged by the external thread of the outer race and also having a recess that receives a segment of the flange that is bent to provide a tab.

9. The combination according to claim 8 wherein the tab is bent outwardly away from the axis.

10. The combination according to claim 8 and further comprising a shaft that carries the inner raceway of the bearing.

11. The combination according to claim 10 and further comprising another bearing that is located in the housing and around the shaft and is otherwise mounted in opposition to the bearing with the threaded cup.

12. A bearing according to claim 1 wherein the locking ring is permanently attached to the outer race.

13. A combination that facilitates rotation about an axis, said combination comprising:
    a housing having an internal thread that is presented inwardly toward the axis and a recess that opens toward the axis, an outer bearing race having an outer raceway that is presented inwardly toward the axis and also having an external thread that is presented outwardly away from the axis and is engaged with the internal thread of the housing so that rotation of the outer race in the housing changes the axial position of the outer race in the housing;

an inner bearing raceway presented outwardly toward the outer raceway of the outer race;

rolling elements arranged in a row between and contacting the outer and inner raceways; and a locking ring coupled directly to the outer race such that the outer race and locking ring cannot be displaced angularly or axially with respect to each other, the locking ring having a flange that is directed generally axially and is divided into circumferentially arranged segments, one of which is bent away from the general axial orientation to form a tab that projects into the recess in the housing and prevents the locking ring and outer race from rotating relative to the housing.

14. The combination according to claim 13 wherein the outer race has an end face and the locking ring has a web from which the flange projects, and the web of the locking ring is against the end face of the outer race.

15. The combination according to claim 14 wherein the locking ring has another flange that projects from the web and is located inwardly from the segmented flange, the other flange being configured for engagement by a tool designed to rotate the locking ring and the outer race.

16. The combination according to claim 14 wherein locking ring is coupled to the outer race by a weld located at the web of the locking ring and the end face of the outer race.

* * * * *